Patented Jan. 4, 1944

2,338,587

UNITED STATES PATENT OFFICE 2,338,587

METHOD OF TREATING CELLULOSE ESTERS

William O. Kenyon and Edward C. Yackel, Rochester, N. Y., assignors to Eastman Kodak Company, Rochester, N. Y., a corporation of New Jersey No Drawing. Application February 24, 1941, Serial No. 380,164

6 Claims. (Cl. 260—230)

This invention relates to the treating of cellulose esters to render them more susceptible toward basic compounds such as basic dyes, which comprises treating the cellulose ester with $NO_2$ or its dimer $N_2O_4$ in the presence of a small amount of moisture.

There have been various instances in which it has been desirable to use a cellulose ester which is reactive toward basic compounds. An example of this is in the photographic art where it is sometimes desirable to apply coatings to the photographic film which are later removed in the processing solutions. Cellulose esters soluble in basic solutions have been prepared by esterifying cellulosic materials with dicarboxylic acid anhydrides, thus esterifying the cellulose with dicarboxylic acid radicals, thus attaching one carboxyl to the cellulose unit while leaving the other carboxyl free to combine with bases so as to result in the formation of water-soluble compounds.

We have found that cellulose esters, soluble in basic solutions, or susceptible to basic compounds may also be prepared by treating partially hydrolyzed cellulose esters of lower fatty acids with $NO_2$ in which a small proportion of moisture is present. We have found that if a partially hydrolyzed lower fatty acid ester of cellulose is treated with $NO_2$ or its dimer $N_2O_4$, or their mixture, the reagent being either in gaseous or liquid form or in solution in an organic liquid, and the cellulose ester being treated being either in solid form or in solution or suspension in an inert organic liquid, the cellulose ester is converted to a compound which is readily susceptible to reaction with basic compounds, whereas previously such action did not occur. For instance, a partially hydrolyzed cellulose acetate butyrate, which was previously resistant to basic dyes, when treated in accordance with our invention is readily susceptible to the effect of a basic dye material. We have found that it is necessary that a small proportion of moisture be present in order to render the cellulose ester susceptible to the action of a basic compound without nitration occurring. For instance, the cellulose ester should contain at least one or two percent of moisture or the reagents or solvents used should have a low moisture content so that the whole system should have an amount of moisture within the range of 1–10%, based on the cellulose ester being treated.

The degree of susceptibility of the products of our invention to basic compounds depends upon the degree of oxidation of the cellulose ester. For instance if a cellulose ester is employed as the starting material for our oxidation process which has a substantial free hydroxyl content a greater degree of oxidation may be imparted thereto than to an ester having a smaller free hydroxyl content. Other factors which influence the degree of oxidation of the cellulose ester are the time of treatment and the amount of $NO_2$ which is employed.

All of the partially hydrolyzed cellulose esters oxidized in accordance with my invention show an increased affinity for basic compounds while those which are oxidized to a sufficient extent are completely soluble in an aqueous NaOH solution of 2% strength.

We believe that by our process at least some of the free hydroxyls of the cellulose compounds treated are converted to groups such as carboxyl which are reactive to bases, thereby imparting new properties to the cellulose esters so treated.

The cellulose esters used as a starting material in our process may be any of the hydrolyzed cellulose esters of lower fatty acid esters. For instance, a partially hydrolyzed cellulose acetate, having an acetyl content of 20–42%, may be employed in this connection. Other cellulosic esters, having corresponding acyl contents, may be employed as the starting material of our process, particularly lower fatty acid esters of cellulose, such as those containing fatty acid radicals of 2–4 carbon atoms. Also substituted lower fatty acid esters may also be employed in our process even though the substituents may give acyls having more than 4 carbon atoms, such as substituted acetic, propionic or butyric acid esters. It is desirable that hydroxy substituted acid esters and unsaturated acid esters of cellulose be avoided as due to their reactivity with $NO_2$ the oxidation reaction is interfered with. The cellulose ester may be treated while in solution or suspension in an inert organic liquid or it may be employed in a form in which it is readily susceptible to treatment, such as yarn, fibers or the like. For example liquids which are inert to $NO_2$ and therefore are useful in our process are petroleum distillates such as Stoddard solvent, ligroin, benzine and the like, inert chlorinated hydrocarbons such as ethylene chloride and propylene chloride, benzene or any of the lower unsubstituted fatty acids. The cellulose ester may be treated with gaseous or liquid $NO_2$ or $NO_2$ in solution in an inert organic solvent, providing 1–10% of moisture, based on the cellulose ester, is present. It is preferred that the amount of moisture present be in the lower part of this range. The treatment is ordinarily satisfactorily carried out under the usual conditions. For instance, the temperature and pressure may be those usually characterized as room temperature and atmospheric pressure. It is to be understood that other conditions of operation such as elevated temperatures or pressures can be used, if desired.

One method by which the cellulose ester may be treated is to pass a slow stream of gaseous $NO_2$ therethrough for several hours or until the cellulose ester shows susceptibility to treatment by basic compounds. By another method of treatment, the cellulose ester may be suspended in a solution of $NO_2$ in a non-solvent for the cellulose ester. By still another method of treatment, the cellulose ester may be dissolved in a solution of $NO_2$ in an organic solvent, such as a lower fatty acid, in which the cellulose ester is soluble. If desired, the cellulose ester may be first put into solution or suspension in the inert organic solvent and the $NO_2$ can then be added thereto. Another method of treatment is to immerse the cellulose ester in liquid $NO_2$, either sufficient to completely cover the cellulose ester or only in an amount in which the dependence must be placed on the penetration of the vapors of the $NO_2$ into the cellulose ester material. The following examples illustrate our invention:

*Example I*

15 grams of cellulose acetate yarn, having an acetyl content of approximately 39%, was placed in a flask which was then evacuated and 3 c. c. of liquid $NO_2$ was allowed to vaporize therein. The mass was allowed to stand for 17 hours in contact with the $NO_2$ vapors. The product was then removed from the flask, washed thoroughly in distilled water and dried. The dried material showed a marked affinity to such basic dies as methylene blue and fuchsin, whereas the untreated product showed practically none. Analysis showed the material had a carboxyl content of approximately 1%.

*Example II*

50 grams of a partially hydrolyzed cellulose acetate in fibrous form, having an acetyl content of 39.6%, was placed in a large vessel and a slow stream of gaseous $NO_2$ was passed therethrough for 17 hours. At the end of this time, the excess gas was blown out of the product with air and the resulting material was washed thoroughly with distilled water until the washings were acid free. The washed product was dried at room temperature. The product displayed poor solubility in acetone, pyridine and ethylene chloride-alcohol until a 50 gram amount was mixed with eight times its weight of pyridine and 25 c. c. of distilled water and the whole warmed on a steam bath for 10-15 minutes. A smooth dope formed which was precipitated in an excess of normal hydrochloric acid. The precipitate was filtered off, washed and air dried. The product then showed excellent solubility in acetone, pyridine, ethylene chloride-alcohol and also 2% aqueous sodium hydroxide.

*Example III*

50 grams of a partially hydrolyzed cellulose acetate in fibrous form, having an acetyl content of 32.4%, were subjected to a slow stream of gaseous $NO_2$ for 17 hours. The product was washed and dried and showed poor solubility in organic solvents. Treatment with 300 c. c. of pyridine and 25 c. c. of distilled water at 50° C. for 4 hours produced a smooth dope which was precipitated in an excess of normal hydrochloric acid. The precipitate was washed free of chloride ion and air-dried at room temperature. The product showed excellent solubility in pyridine and acetone as well as 2% aqueous sodium hydroxide solution and in ammonium hydroxide.

*Example IV*

25 grams of a partially hydrolyzed cellulose acetate in fibrous form (acetyl content 32.4%) in a finely precipitated form was suspended in a solution of 15 c. c. of a freshly distilled liquid $NO_2$ in 375 c. c. of carbon tetrachloride. The suspension was continuously stirred for 18 hours. The cellulosic material was washed free of acid and air dried. It displayed poor solubility in organic solvents until treated with a basic material.

*Example V*

40 grams of a partially hydrolyzed cellulose acetate (acetyl 33%) was dissolved in 400 c. c. of glacial acetic acid. A solution of 100 grams of $N_2O_4$ in 100 c. c. of glacial acetic acid was added thereto and the mass was allowed to stand at room temperature. Samples were taken at the times indicated and after precipitating, washing and drying were analyzed for acetyl and for apparent acetyl. The divergence between these values indicates the degree of oxidation of the cellulose ester achieved.

| Time of reaction | Apparent acetyl | Analysis for acetyl |
|---|---|---|
| | *Percent* | *Percent* |
| 10 hours | 31.7 | 31.4 |
| 28 hours | 33.1 | 31.0 |
| 69 hours | 35.0 | 30.4 |
| 120 hours | 38.5 | 31.0 |

This example illustrates that the time of treatment depends upon the degree of oxidation desired.

In each of the above examples sufficient moisture was assured either by being supplied by the cellulose ester or by the reagents used, or by addition, in order to assure a moisture content of 1-10%. The product in every case was susceptible to the action of basic dyes or basic compounds generally. In some cases as illustrated by Examples II, III and IV it is necessary to treat the product with a material which will form a salt of the carboxyl group in order to convert it to a form in which it was readily soluble in organic solvents. That the initial product is poorly soluble in organic solvents is thought to be due to a formation of anhydride groups in the reaction and therefore the resulting product is treated with a salt-forming material which will combine with carboxyl groups without causing hydrolysis of the cellulose ester. For this purpose, bases, such as pyridine or other organic amines, ammonia or the alkali or alkaline earth metal salts of weak acids, such as sodium carbonate, calcium acetate or acetates of other metals, such as of zinc, barium, cadmium, magnesium or copper, or calcium salts of other acids, such as the propionates, butyrates, lactates, or the like, may be employed. If care is used to avoid hydrolysis of the ester, basic hydroxides such as NaOH can be employed in this connection.

After the oxidized cellulose ester has been treated with a base which forms the salt, it may be either recovered in that form or it may be treated with acid to obtain the acid form of the oxidized cellulose ester. This may ordinarily be accomplished by treatment with dilute aqueous mineral acid as illustrated by Example III.

In some cases it may be desirable in preparing oxidized cellulose esters to first oxidize the cellulose, such as described and claimed in U. S. Patent No. 2,232,990, dated February 25, 1941, and subsequently esterify that cellulose. For instance oxidized celluloses prepared by oxidizing with $NO_2$ and having carbon dioxide equivalences of 20.1%, 13.6%, 11.7% and 5.7%, were each esterified in the following manner:

10 grams of the oxidized cellulose were added to a mixture of 72 c.c. of Stoddard solvent and 8 c.c. of glacial acetic acid in a stoppered container. This mixture was allowed to stand for 20 hours at room temperature. A mixture of 29 c.c. of glacial acetic acid, 43 c.c. of 95% acetic anhydride, 38 c.c. of Stoddard solvent, 8 c.c. of trichloroethylene and 0.1 c.c. of concentrated sulfuric acid was added to the cellulose mass and the whole was well stirred. The container was then placed in a bath having a temperature of 40° C. and was kept there for 92 hours with occasional stirring. At the end of this time, the cellulosic material, which is still in fibrous condition, was separated, washed in alcohol, and then in distilled water until the washings were neutral. The cellulose was then air-dried at room temperature. These products were then analyzed for acetyl by the distillation method. This method consists of hydrolyzing the cellulose ester in an alkaline solution such as half normal NaOH followed by addition of phosphoric acid to liberate the acyl and subsequent vacuum distillation of the acidified solution. The acid in the distillate is then estimated as acetic acid. The acetyl, which should be present in the products, was also calculated based on the percentage of oxidation of the original cellulose which indicates the number of free and esterifiable hydroxyl groups which are present. The following results were obtained:

| $CO^2$ equivalence of starting material | Acetyl by distillation | Acetyl calculated |
|---|---|---|
| Percent | Percent | Percent |
| 20.1 | 33.0 | 35.17 |
| 13.6 | 38.4 | 38.9 |
| 11.7 | 38.4 | 39.8 |
| 5.7 | 41.4 | 42.5 |

We claim:

1. A method of rendering partially hydrolyzed, lower fatty acid esters of cellulose susceptible to the action of basic compounds, which comprises treating the ester with $(NO_2)_x$, $x$ being a number within the range 1–2, and an amount of moisture 1–10% of the cellulose ester treated.

2. A method of rendering partially hydrolyzed cellulose acetate susceptible to the action of basic compounds, which comprises treating the ester with $(NO_2)_x$, $x$ being a number within the range 1–2, and an amount of moisture 1–10% of the cellulose ester treated.

3. A method of preparing a cellulose ester susceptible to the action of basic compounds, which comprises treating a partially hydrolyzed cellulose acetate, having an acetyl content of 33%, with $(NO_2)_x$, $x$ being a number within the range 1–2, and an amount of moisture 1–10% of the cellulose ester treated.

4. A method of rendering a partially hydrolyzed, lower fatty acid ester of cellulose susceptible to the action of basic compounds, which comprises treating the ester in an inert organic liquid with $(NO_2)_x$, $x$ being a number within the range 1–2, and an amount of moisture 1–10% of the cellulose ester treated.

5. A method of rendering a partially hydrolyzed cellulose acetate susceptible to the action of basic compounds, which comprises treating the ester in fibrous form with gaseous $NO_2$ and an amount of moisture 1–10% of the cellulose ester treated.

6. A method of rendering a partially hydrolyzed, lower fatty acid ester of cellulose susceptible to the action of basic compounds, which comprises treating the ester with liquid $NO_2$ and an amount of moisture 1–10% of the cellulose ester treated.

WILLIAM O. KENYON.
EDWARD C. YACKEL.